United States Patent
Sakaguchi et al.

(10) Patent No.: US 12,021,424 B2
(45) Date of Patent: Jun. 25, 2024

(54) COIL, AND STATOR, ROTOR, AND MOTOR EQUIPPED WITH SAME, AND MANUFACTURING METHOD FOR COIL

(71) Applicant: Panasonic Intellectual Property Management Co., Ltd., Osaka (JP)

(72) Inventors: Hiroki Sakaguchi, Osaka (JP); Yoshiharu Nakamura, Osaka (JP); Shoichi Koyama, Osaka (JP); Toshikiyo Kawamura, Mie (JP); Kiyomi Kawamura, Osaka (JP); Hideyuki Taniguchi, Osaka (JP); Akihiko Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 354 days.

(21) Appl. No.: 17/607,923

(22) PCT Filed: May 21, 2020

(86) PCT No.: PCT/JP2020/020070
§ 371 (c)(1),
(2) Date: Nov. 1, 2021

(87) PCT Pub. No.: WO2020/255614
PCT Pub. Date: Dec. 24, 2020

(65) Prior Publication Data
US 2022/0320932 A1    Oct. 6, 2022

(30) Foreign Application Priority Data

Jun. 17, 2019 (JP) ................................ 2019-111731

(51) Int. Cl.
*H02K 3/18* (2006.01)
*H02K 1/14* (2006.01)
(Continued)

(52) U.S. Cl.
CPC ............... *H02K 3/18* (2013.01); *H02K 1/146* (2013.01); *H02K 1/24* (2013.01); *H02K 3/28* (2013.01);
(Continued)

(58) Field of Classification Search
CPC ........ H02K 3/18; H02K 15/095; H02K 1/146; H02K 15/045; H02K 3/28; H02K 1/24; H02K 3/522; H02K 15/0435
See application file for complete search history.

(56) References Cited

U.S. PATENT DOCUMENTS

| | | | |
|---|---|---|---|
| 8,122,593 B2* | 2/2012 | Gorohata | H02K 15/085 29/760 |
| 9,287,743 B2* | 3/2016 | Fubuki | H01F 41/071 |
| 2011/0048092 A1* | 3/2011 | Saigo | H01F 41/096 72/146 |

FOREIGN PATENT DOCUMENTS

| | | | |
|---|---|---|---|
| JP | 2004-080860 | | 3/2004 |
| JP | 5246020 B | | 7/2013 |
| JP | 2015228476 A | * | 12/2015 |

OTHER PUBLICATIONS

JP-2015228476-A machine translation Dec. 16, 2023.*
International Search Report of PCT application No. PCT/JP2020/020070 dated Aug. 25, 2020.

* cited by examiner

*Primary Examiner* — Leda T Pham
(74) *Attorney, Agent, or Firm* — Rimon P.C.

(57) ABSTRACT

A coil is configured with stacked n turns (where n is an integer of 2 or more) of spirally wound conductive wire having a rectangular cross-section. A k-th turn (where k is an integer and $1 \leq k \leq n$) of the coil has at least a straight portion and a corner portion extending from an end part of the straight portion. On an outer peripheral surface of the corner
(Continued)

portion, there are formed at least a first bent portion bent toward an inner peripheral side and a second bent portion bent toward the outer peripheral side, and curvature C1 of the first bent portion is different from curvature C2 of second bent portion.

16 Claims, 13 Drawing Sheets

(51) Int. Cl.
*H02K 1/24* (2006.01)
*H02K 3/28* (2006.01)
*H02K 3/52* (2006.01)
*H02K 15/04* (2006.01)
*H02K 15/095* (2006.01)

(52) U.S. Cl.
CPC ........... *H02K 3/522* (2013.01); *H02K 15/045* (2013.01); *H02K 15/095* (2013.01); *H02K 2213/03* (2013.01)

FIG. 1
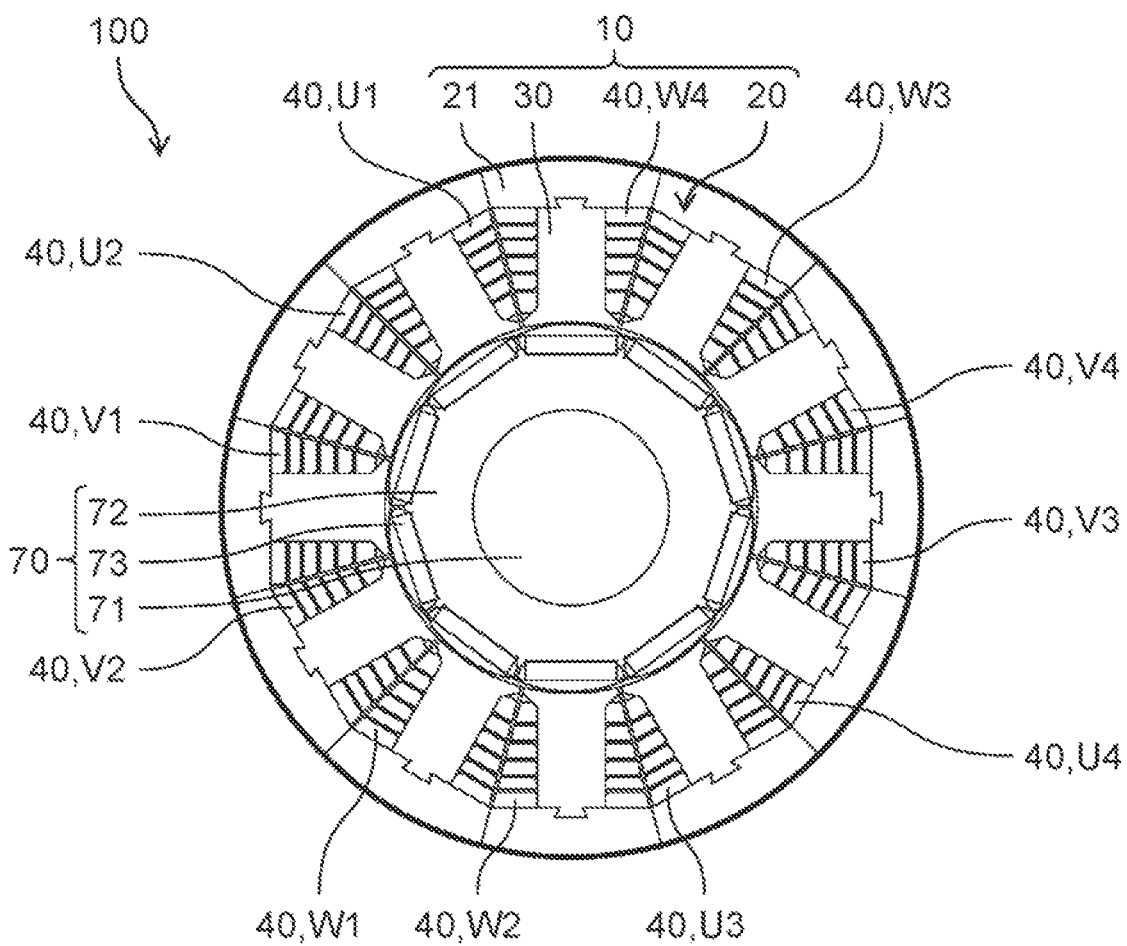
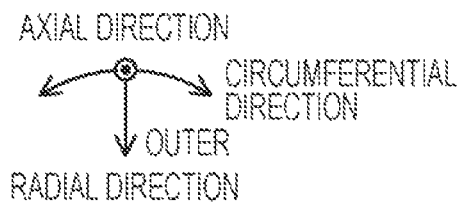

FIG. 4
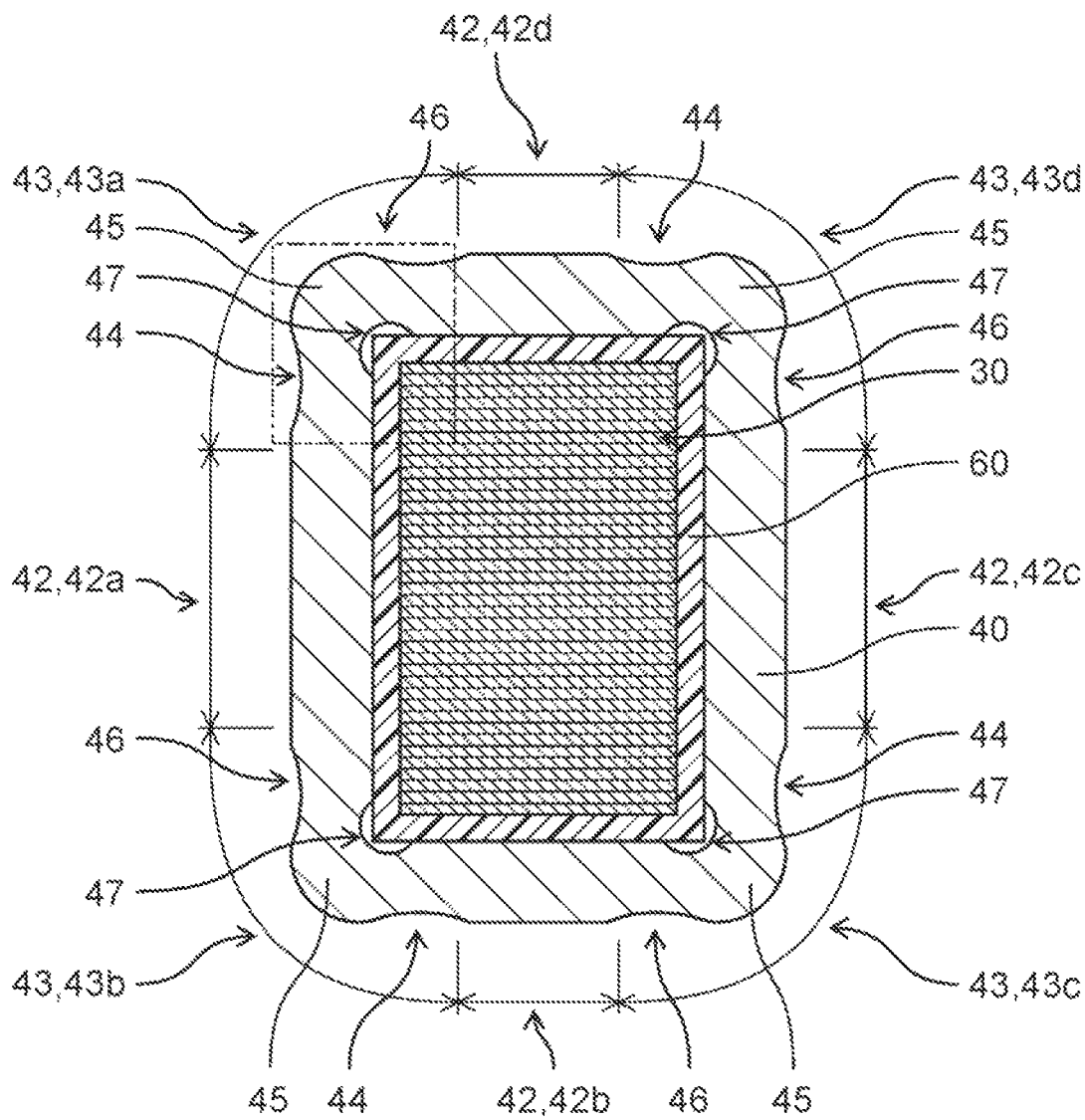
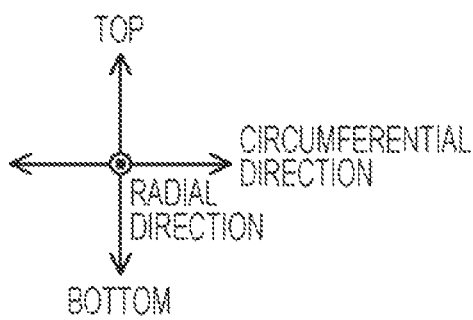

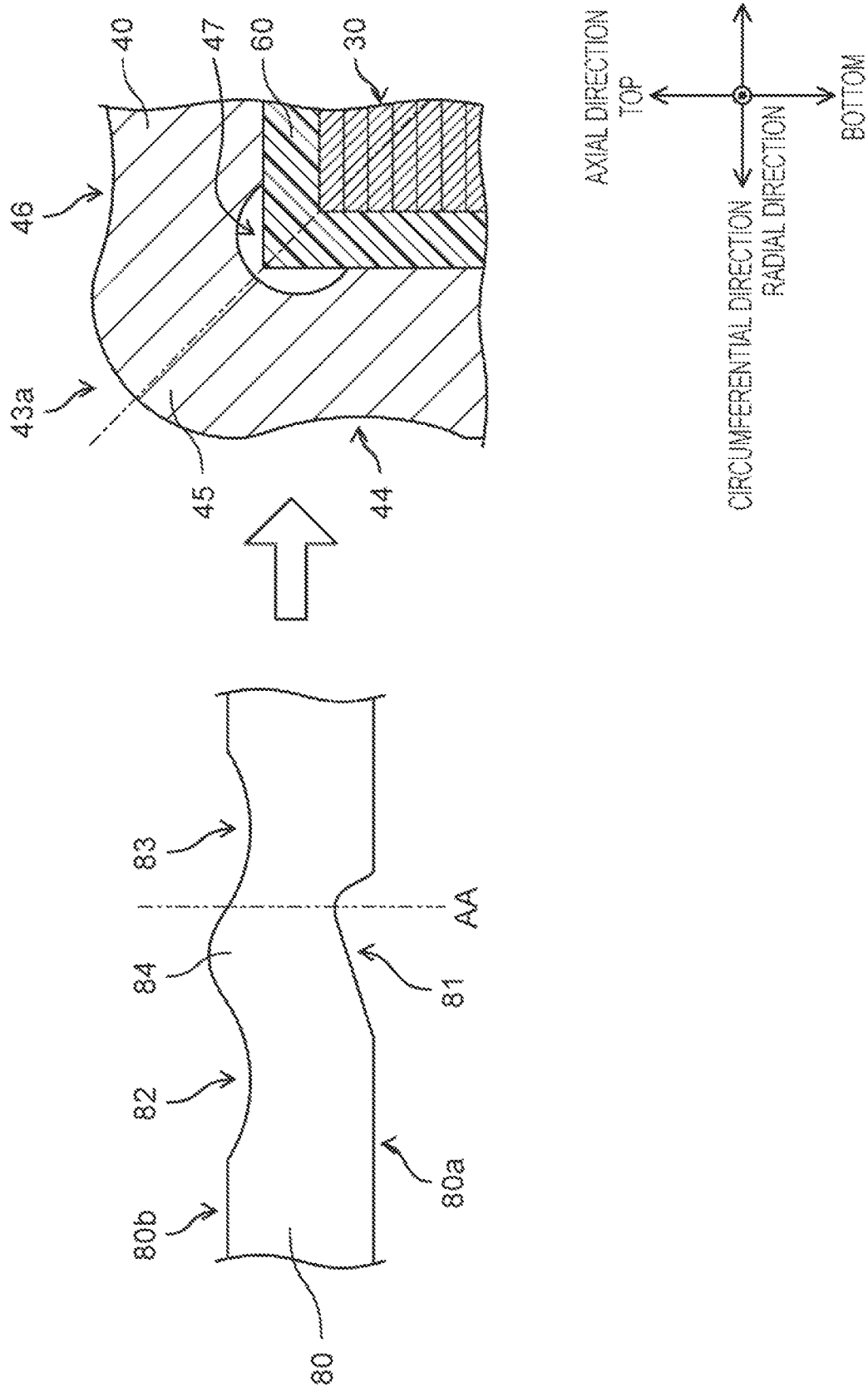

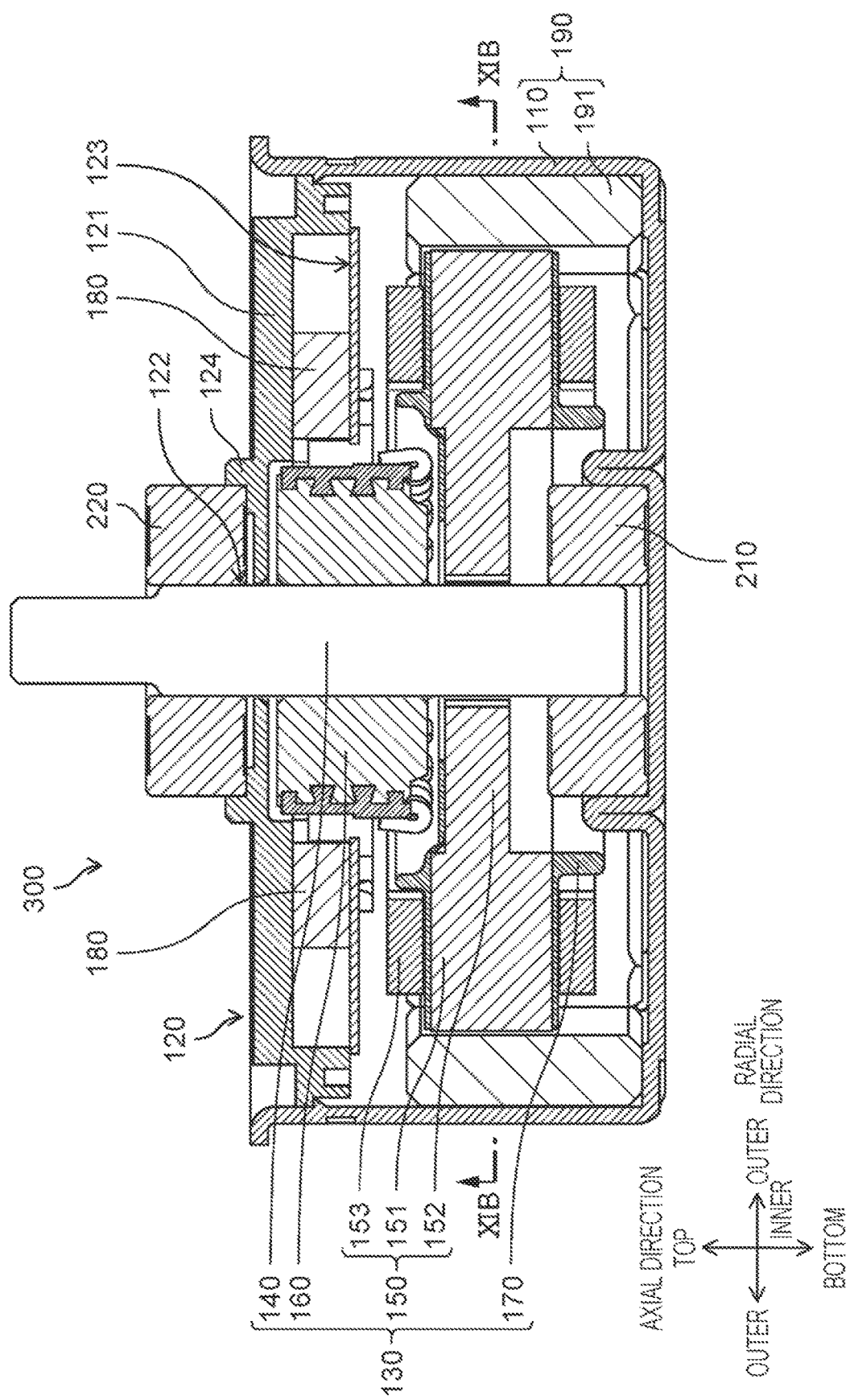

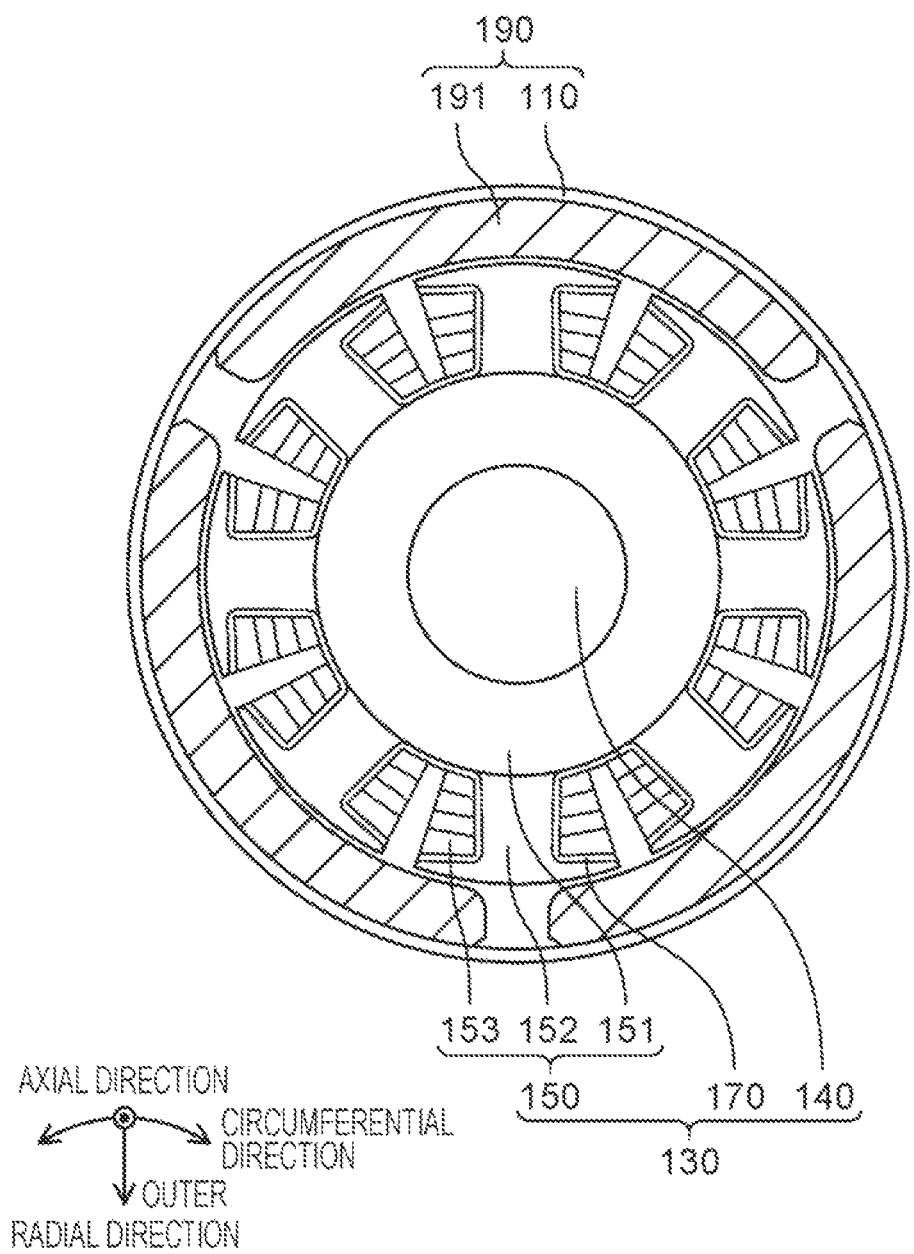

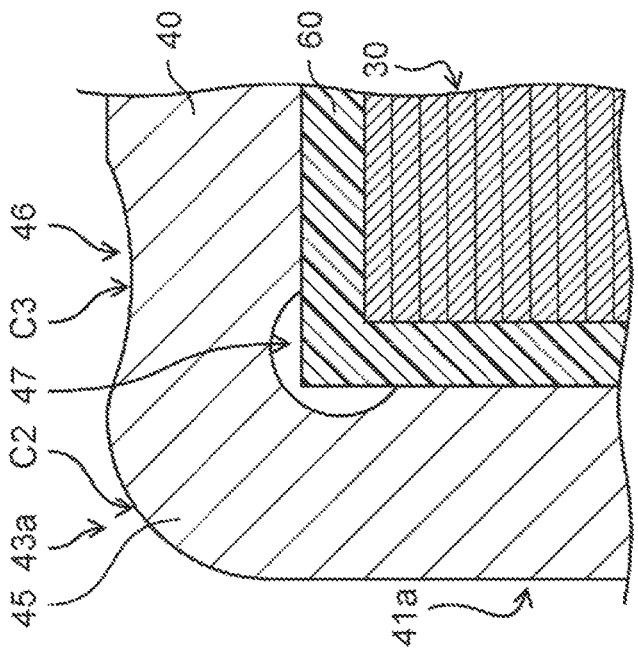
FIG. 12B
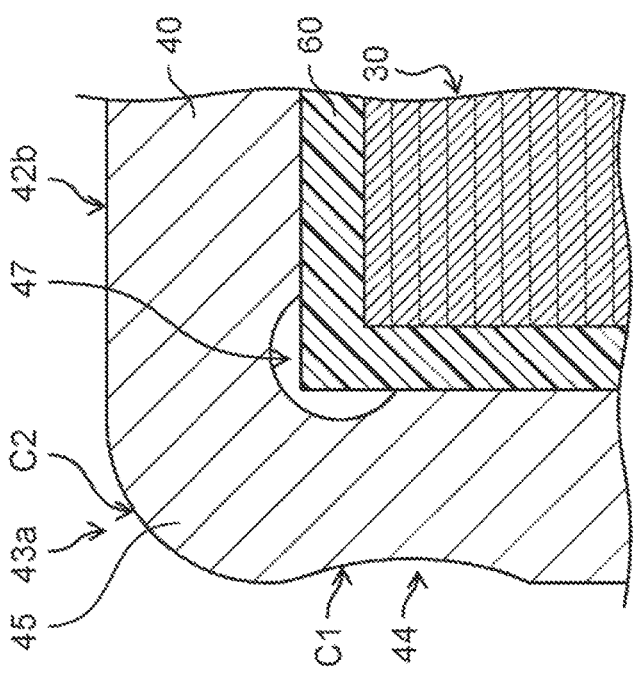
FIG. 12A
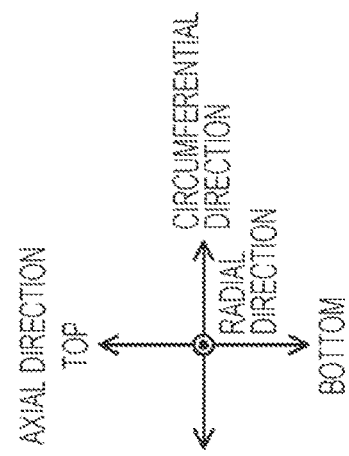

COIL, AND STATOR, ROTOR, AND MOTOR EQUIPPED WITH SAME, AND MANUFACTURING METHOD FOR COIL

CROSS-REFERENCE TO RELATED APPLICATIONS

This application is a U.S. national stage application of the PCT International Application No. PCT/JP2020/020070 filed on May 21, 2020, which claims the benefit of foreign priority of Japanese patent application 2019-111731 filed on Jun. 17, 2019, the contents all of which are incorporated herein by reference.

TECHNICAL FIELD

The present disclosure relates to a coil and a stator, a rotor, and a motor that are equipped with the coil, and a manufacturing method for the coil.

BACKGROUND ART

In recent years, there has been a demand for further reduction in size and improvement in efficiency of motors for in-vehicle and industrial applications. As one of methods for improving efficiency while suppressing an increase in volume of a motor, it is known that a coil formed by winding a flat square wire is used to improve a space factor of the coil in a slot of a stator. By improving the space factor of the coil, it is possible to suppress loss caused by a current flowing through the coil when the motor is driven, so that the efficiency of the motor is improved.

For example, PTL 1 discloses a coil including a plurality of turns in which a flat square wire, that is, a winding wire having an insulating film applied to a surface of a conductor having a rectangular cross-section, is wound. The coil has, in each turn: straight portions in which the winding wire is disposed straight; and curved portions in each of which the winding wire is disposed in a curved manner to be connected to the straight portions.

However, in the conventional configuration disclosed in PTL 1, there tends to be, at the curved portions, a large difference in a degree of tension between an inner peripheral side of the conductive wire and an outer peripheral side of the conductive wire. As a result, when a curvature or thickness of the conductive wire is required to be larger on the inner peripheral side of the conductive wire, the conductive wire can be damaged.

CITATION LIST

Patent Literature

PTL 1: Japanese Patent No. 5246020

SUMMARY

The present disclosure has been made in view of the above points. An object of the present disclosure is to provide a coil in which damage to a conductive wire is suppressed, to provide a stator, a rotor, and a motor that include the coil, and to provide a manufacturing method for the coil while increasing a space factor.

In order to achieve the above object, a coil according to the present disclosure includes: n turns of spirally wound conductive wire having a rectangular cross-section, where n is an integer of 2 or more, the n turns of spirally wound conductive wire being stacked in a first direction. A k-th turn, where k is an integer and $1 \leq k \leq n$, of the coil includes at least a straight portion and a corner portion extending from an end part of the straight portion, an outer peripheral surface of the corner portion has at least a first bent portion formed to be bent toward an inner peripheral side and a second bent portion formed to be bent toward an outer peripheral side, and a curvature of the first bent portion is different from a curvature of the second bent portion.

Furthermore, a manufacturing method for a coil according to the present disclosure includes at least the following steps: a wire rod preparing step for preparing a conductive wire having a first surface and a second surface opposed to the first surface; a recess forming step including: forming, in the first surface of the conductive wire, first recesses directed toward the second surface at predetermined intervals along a longitudinal direction of the conductive wire; and forming, on the second surface, a second recess and a third recess that are directed toward the first surface on respective ones of both sides of a position opposed to each of the first recesses; and a winding step of winding the conductive wire around a wound member having a rectangular cross-section, wherein the first surface of the conductive wire is in contact with a surface of the wound member, and corner portions of the wound member are each contained in one of the first recesses.

By this method, it is possible to easily form, in the coil, the first bent portion, the second bent portion, the third bent portion, and the recessed portion.

The coil of the present disclosure can suppress a local stress concentration on the conductive wire of the coil. Therefore, damage to the conductive wire can be suppressed. By the manufacturing method for a coil of the present disclosure, it is possible to form, in the coil, the first bent portion, the second bent portion, the third bent portion, and the recessed portion.

BRIEF DESCRIPTION OF DRAWINGS

FIG. 1 is a schematic diagram of a motor according to a first exemplary embodiment.

FIG. 4 is a schematic cross-sectional view, in an axial direction, of a salient pole to which the coil is attached.

FIG. 9 is an explanatory view of a coil manufacturing process according to a second modification.

FIG. 11A is a schematic cross-sectional view of a motor according to a second exemplary embodiment.

FIG. 11B is a schematic cross-sectional view taken along line XIB-XIB in FIG. 11A.

FIG. 12A is a schematic cross-sectional view, in the axial direction, of a salient pole to which another coil is attached.

FIG. 12B is a schematic cross-sectional view, in the axial direction, of a salient pole to which still another coil is attached.

DESCRIPTION OF PREFERRED EMBODIMENTS

Figure 2:
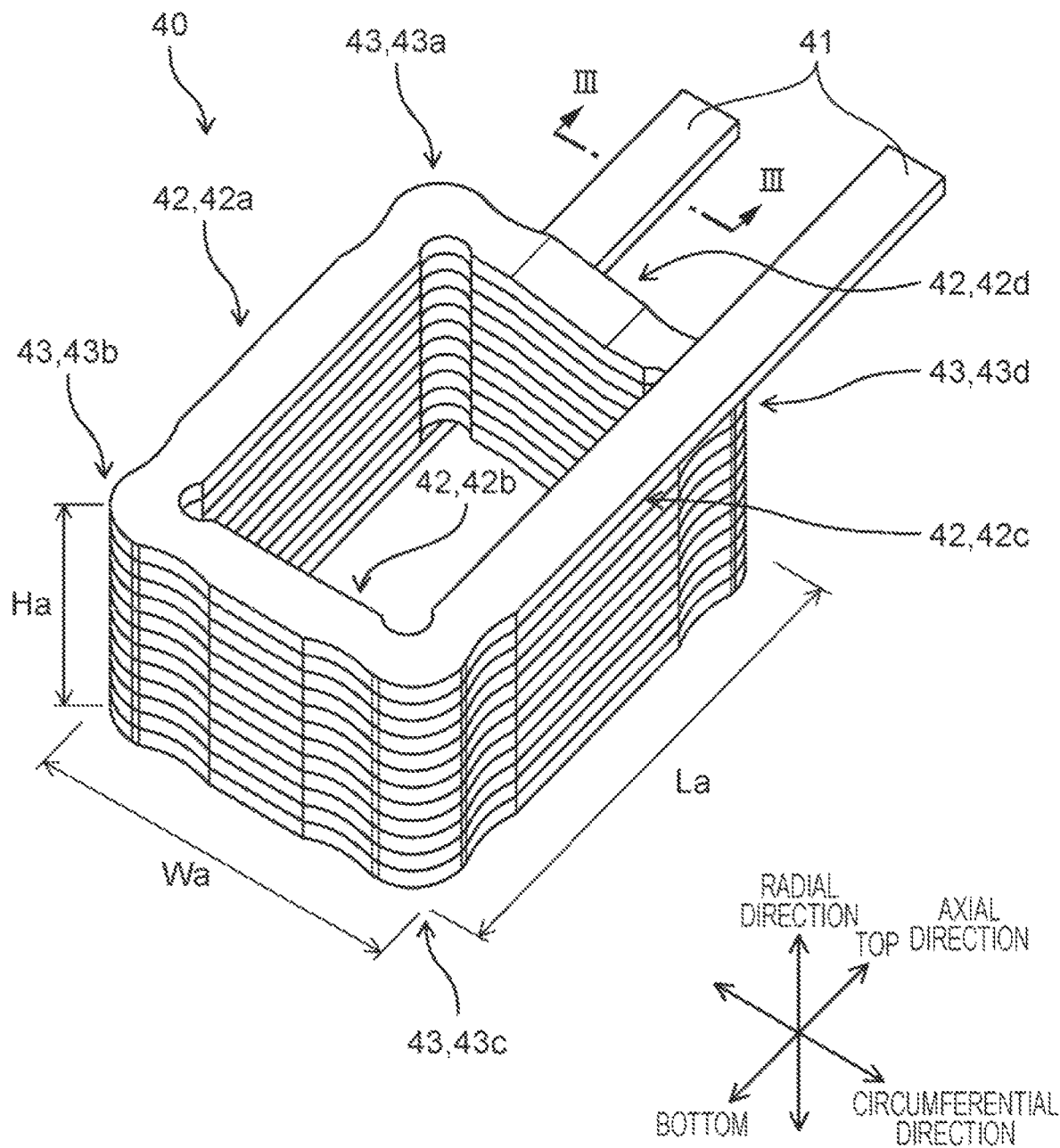
FIG. 2 is a perspective view showing a coil according to the first exemplary embodiment.

Hereinafter, exemplary embodiments of the present disclosure will be described in detail with reference to the drawings. The following description of the preferred exemplary embodiments is inherently only examples and is not intended at all to limit the present invention, applications of the present disclosure, or use of the present invention.

First Exemplary Embodiment

[Configuration of Motor]

FIG. 1 is a schematic diagram of a motor according to a first exemplary embodiment. In the following description, a radial direction of motor 100 or stator 10 may be referred to as a "radial direction", an outer circumferential direction may be referred to as a "circumferential direction", and an extending direction of shaft 71 (the direction perpendicular to the paper surface in FIG. 1) may be referred to as an "axial direction". The radial direction is referred to as a first direction in some cases. In the radial direction, a center side of motor 100 is referred to as an inner side, and an outer peripheral side is referred to as an outer side, in some cases.

As illustrated in FIG. 1, motor 100 includes stator 10 and rotor 70. Motor 100 includes other components than the above components, for example, components such as a bearing that pivotally supports a frame and the shaft; however, illustration and description of those components are omitted for convenience of description.

Stator 10 includes: an annular yoke 20; a plurality of salient poles 30 connected to an inner periphery of yoke 20 and provided at equal intervals along the inner periphery; and coils 40 housed in slots provided between the salient poles 30 adjacent to each other in the circumferential direction. Stator 10 is disposed on radially outside the rotor 70 with a predetermined gap between stator 10 and rotor 70. Slots are the spaces between salient poles 30 adjacent to each other in the circumferential direction.

Yoke 20 and salient poles 30 are each formed by, for example, stacking electromagnetic steel sheets containing silicon and the like and then by punching the stacked electromagnetic steel sheets. The yoke 20 is formed by the following process: a plurality of divided yokes 21 each having salient pole 30 connected to its inner periphery are arranged in one direction and connected to each other; and the connected yokes 21 are bent to form an annular shape, and both ends of the connected yokes 21 are coupled to each other. Across-sectional shape of each salient pole 30 in the axial direction is a rectangular shape, in other words, a quadrangular shape (see FIG. 4).

As described later, coil 40 is a component formed of n turns of wound conductive wire 50 (see FIG. 3), where n is an integer of 2 or more. Coils 40 are housed in the slots, each being attached to one of the plurality of salient poles 30 via insulator 60 (see FIGS. 4 to 6). To attach coils 40 to salient poles 30, a winding wire may be wound around each salient pole 30 to which insulator 60 is attached, for example. Alternatively, coils 40 previously wound in accordance with the shape of salient pole 30 may be attached from a radially outer end of respective ones of salient poles 30. In this case, salient poles 30 to which coils 40 are mounted are connected to divided yokes 21.

In the present exemplary embodiment, depending on phases of currents flowing through coils 40, coils 40 each may be referred to as coil U1 to coil U4, coil V1 to coil V4, and coil W1 to coil W4, in some cases.

Rotor 70 includes: shaft 71; substantially cylindrical rotor core 72 in which shaft 71 is contained at an axial center and in which a plurality of permanent magnets 73 are contained on the outer peripheral side; and the plurality of permanent magnets 73 disposed to face stator 10 in such a manner that N poles and S poles of the permanent magnets 73 are alternately arranged along an outer circumferential direction of rotor core 72. Note that a material, a shape, and a quality of material of permanent magnets 73 can be appropriately changed depending on an output of motor 100 and the like. Similarly to yokes 20 and salient poles 30, rotor core 72 is also formed by processing stacked electromagnetic steel sheets.

Coils U1 to U4, V1 to V4, and W1 to W4 are each connected in series. Three phase currents of U, V, and W having 120° phase differences in electric angle are respectively supplied to coils U1 to U4, V1 to V4, and W1 to W4 to excite the coils, thereby generating a rotating magnetic field in stator 10. The rotating magnetic field and the magnetic field generated by permanent magnets 73 provided in rotor 70 causes an interaction between them, and a rotational torque is thus generated in rotor 70. Being supported by a bearing (not shown), shaft 71 rotates about an axial line that passes through a center of shaft 71 and extends in the axial direction.

[Configuration of Coil]

Figure 3:
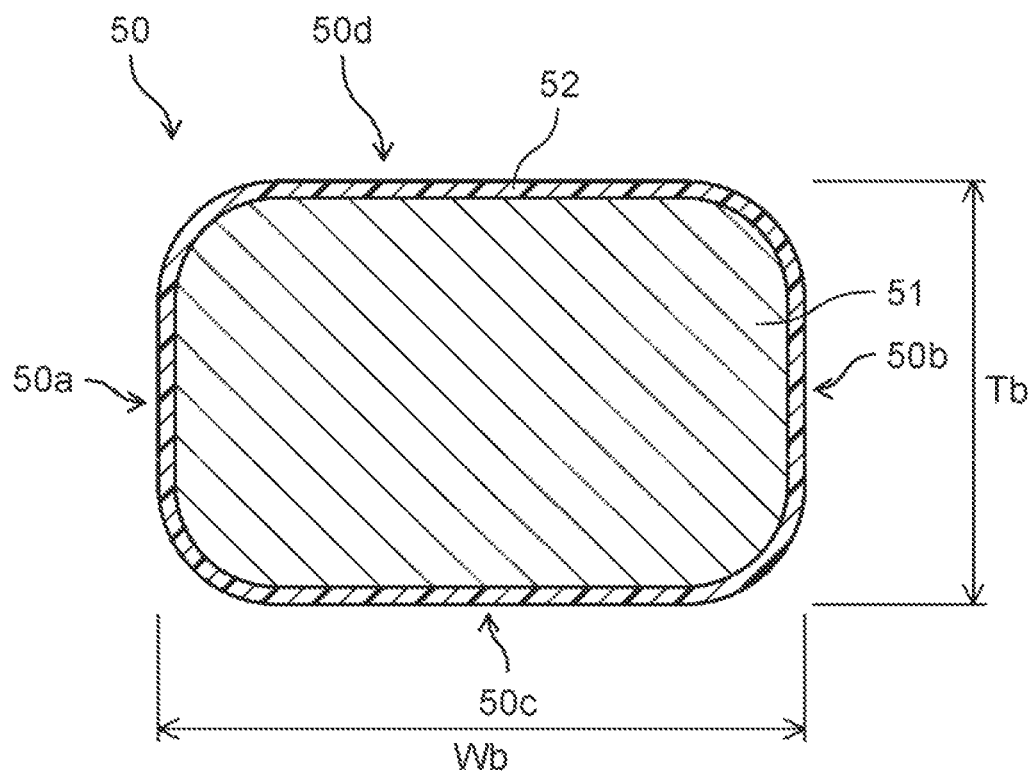
FIG. 3 is a cross-sectional view taken along line III-III in FIG. 2.
Figure 5:
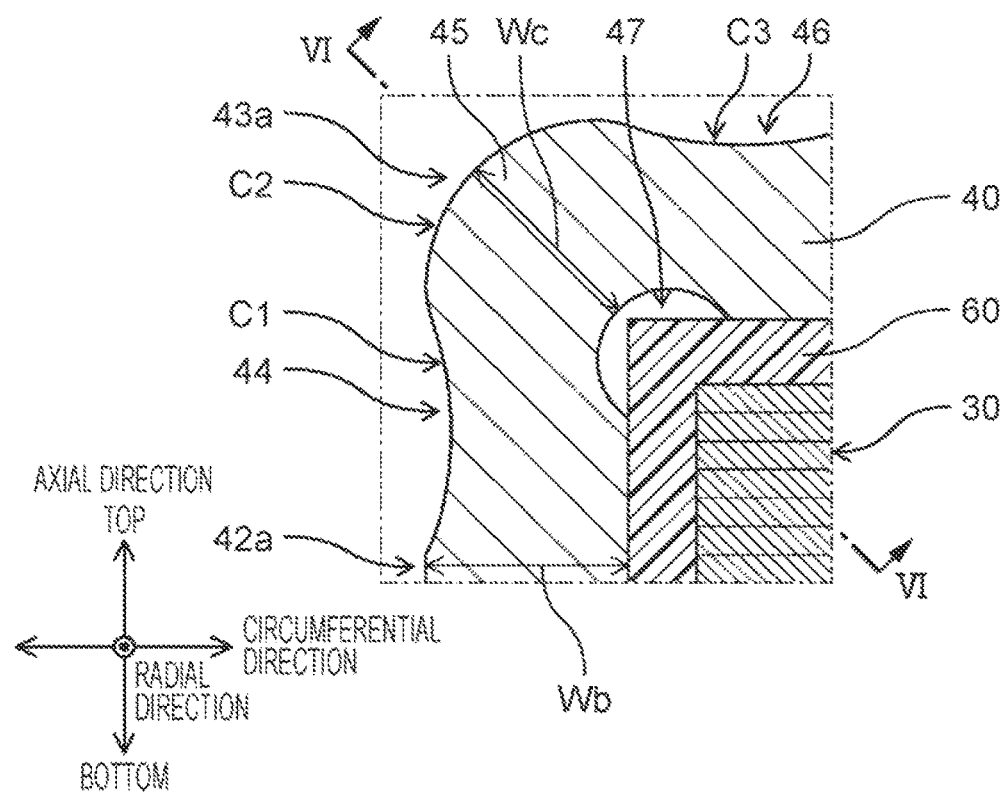
FIG. 5 is an enlarged view of the part surrounded by the two-dot chain line in FIG. 4.
Figure 6:
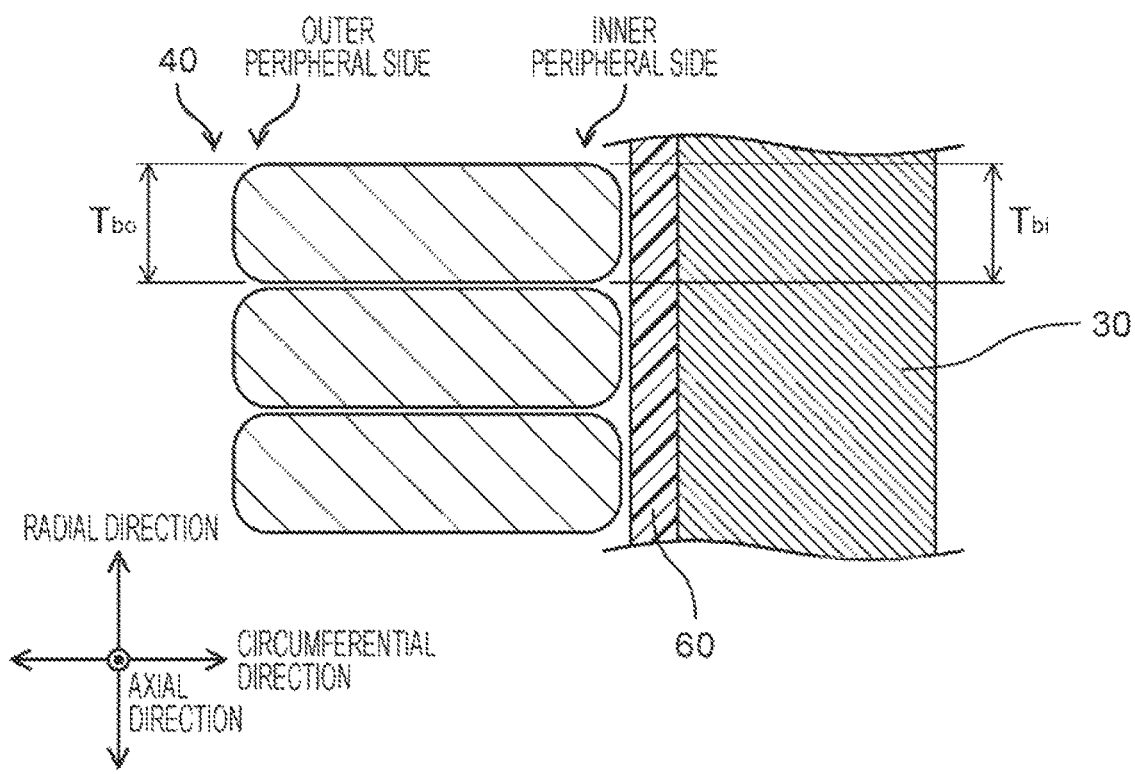
FIG. 6 is a cross-sectional view taken along line VI-VI in FIG. 5.

FIG. 2 is a perspective view showing coil 40 according to the first exemplary embodiment. FIG. 3 is a cross-sectional view taken along line III-III in FIG. 2. FIG. 4 is a schematic cross-sectional view, in the axial direction, of a salient pole to which coil 40 is attached. FIG. 5 is an enlarged view of the part surrounded by the two-dot chain line in FIG. 4. FIG. 6 is a cross-sectional view taken along line VI-VI in FIG. 5. FIGS. 4 and 5 each illustrate a cross-section of a k-th turn of coil 40, where k is an integer and $1 \leq k \leq n$. For convenience of description, FIG. 6 illustrates only a part of salient pole 30 around which coil 40 is wound.

As illustrated in FIG. 2, coil 40 has conductive wire 50 (see FIG. 3) spirally wound therearound. Coil 40 is a component configured with conductive wire 50 stacked n turns in a predetermined first direction, in this case, in the radial direction. Coil 40 has led-out portions 41 at both ends thereof. Led-out portions 41 are used for connection with another coil 40 or connection with an electric wire (not illustrated) drawn from outside of motor 100.

As illustrated in FIG. 3, conductive wire 50 of coil 40 is configured with metal wire 51 made of conductive metal and insulating film 52 covering a surface of the metal wire. A cross-section of metal wire 51 is substantially rectangular, and corner portions thereof are rounded. This configuration is to suppress concentration of a stress on insulating film 52 at a corner portion of metal wire 51 and to thereby suppress damage to insulating film 52 and suppress lowering of strength of insulating film 52 below a required strength. As insulating film 52, enamel or the like is used, for example.

However, insulation film 52 is not limited to this example, and other insulating resin materials may be used. Material of metal wire 51 is preferably a low resistivity material such as copper, a copper-based alloy, aluminum, or an aluminum-based alloy. The four surfaces illustrated in FIG. 3 each may be referred to as first surface 50a, second surface 50b, third surface 50c, and fourth surface 50d. Of these surfaces, first surface 50a corresponds to an inner peripheral surface of coil 40, and second surface 50b corresponds to an outer peripheral surface of coil 40.

Coil 40 has an axial direction dimension La of about 15 mm to 100 mm, a circumferential direction dimension Wa of about 4 mm to 90 mm, and a radial direction dimension Ha of about 10 mm to 150 mm. Conductive wire 50 has a thickness Tb of about 0.1 mm to 5 mm and a width Wb of about 1 mm to 20 mm.

However, there is no particular limitation in these dimensions, and the dimensions are appropriately changed depending on a performance required for motor 100, the size of the slot, and the like.

Furthermore, as illustrated in FIGS. 4 and 5, the k-th turn of coil 40 has a square annular shape in accordance with the cross-sectional shapes of salient pole 30 and insulator 60. Insulator 60 has, on a part to which coil 40 is attached, a shape that is along the outer peripheral surface of salient pole 30, in other words, insulator 60 has a rectangular cylindrical shape. Insulator 60 is a component made of an insulating resin and electrically insulates coil 40 from salient pole 30.

The k-th turn of coil 40 has first straight portion 42a, second straight portion 42b, third straight portion 42c, and fourth straight portion 42d, and has first corner portion 43a, second corner portion 43b, third corner portion 43c, and fourth corner portion 43d respectively extending from ends of first straight portion 42a, second straight portion 42b, third straight portion 42c, and fourth straight portion 42d. In the following description, first straight portion 42a, second straight portion 42b, third straight portion 42c, and fourth straight portion 42d may be collectively referred to as straight portion 42, and first corner portion 43a, second corner portion 43b, third corner portion 43c, and fourth corner portion 43d may be collectively referred to as corner portion 43.

First straight portion 42a and third straight portion 42c are provided to face each other at a predetermined interval in the circumferential direction. Second straight portion 42b and fourth straight portion 42d are provided to face each other at a predetermined interval in the axial direction. The direction in which first straight portion 42a and third straight portion 42c face each other is substantially orthogonal to the direction in which second straight portion 42b and fourth straight portion 42d face each other. In the present specification, the expression "substantially orthogonal" means being orthogonal, taking into account manufacturing tolerances or assembly tolerances of the components constituting motor 100, and does not mean being strictly orthogonal. In addition, the expression "substantially the same" or "substantially identical" means the same or identical, taking into account manufacturing tolerances or assembly tolerances of components constituting motor 100, and does not mean being exactly the same or identical.

First corner portion 43a couples first straight portion 42a and fourth straight portion 42d to each other. Second corner portion 43b couples first straight portion 42a and second straight portion 42b to each other. Third corner portion 43c couples second straight portion 42b and third straight portion 42c to each other. Fourth corner portion 43d couples third straight portion 42c and fourth straight portion 42d to each other.

As illustrated in FIG. 4, first bent portion 44, second bent portion 45, and third bent portion 46 are formed on an outer peripheral surface of each of first corner portion 43a, second corner portion 43b, third corner portion 43c, and fourth corner portion 43d. For example, as illustrated in FIG. 5, first bent portion 44 and third bent portion 46 are formed on the outer peripheral surface of first corner portion 43a. First bent portion 44 and third bent portion 46 are bent toward the inner peripheral side. First bent portion 44 and third bent portion 46 have a concave shape when viewed on a cross-section in the axial direction. Second bent portion 45 is formed on the outer peripheral surface of first corner portion 43a. Second bent portion 45 is bent toward the outer peripheral side. Second bent portion 45 has a convex shape when viewed on the cross-section in the axial direction. Third bent portion 46 is formed on a side opposite to first bent portion 44 with second bent portion 45 interposed therebetween. A curvature C1 of first bent portion 44, a curvature C2 of second bent portion 45, and a curvature C3 of third bent portion 46 are different from each other (see FIG. 5). First bent portion 44, second bent portion 45, and third bent portion 46 formed on each of the outer peripheral surfaces of second corner portion 43b, third corner portion 43c, and fourth corner portion 43d also have the same shapes.

Recessed portion 47 directed to an outer peripheral surface of second bent portion 45 is formed in an inner peripheral surface of second bent portion 45 formed on each of first corner portion 43a, second corner portion 43b, third corner portion 43c, and fourth corner portion 43d. When viewed on the cross-section in the axial direction, the four corner portions of salient pole 30 are contained, via insulator 60, in respective ones of recessed portions 47 formed in first corner portion 43a, second corner portion 43b, third corner portion 43c, and fourth corner portion 43d.

As illustrated in FIG. 5, the k-th turn of coil 40 is configured such that a line width We between second bent portion B and recessed portion 47 is 90% or more of the line width Wb of straight portion 42.

As illustrated in FIG. 6, at first corner portion 43a of coil 40, a thickness $T_{bi}$ on the inner peripheral side and a thickness $T_{bo}$ on the outer peripheral side of the k-th turn are substantially equal to each other. Not illustrated, but the thickness $T_{bi}$ on the inner peripheral side and the thickness $T_{bo}$ on the outer peripheral side of the k-th turn are substantially equal to each other also at second corner portion 43b, third corner portion 43c, and fourth corner portion 43d.

As is clear from FIGS. 2 to 4, coil 40 is a so-called edgewise winding coil, and conductive wire 50 is bent on first surfaces 50a and second surfaces 50b, which are short sides.

[Manufacturing Method for Coil]

Figure 7A:
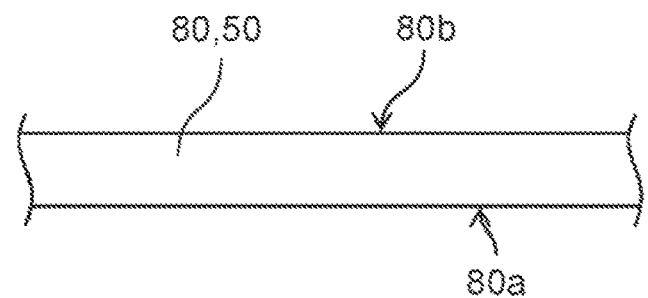
FIG. 7A is an explanatory view of a wire rod preparing step in a coil manufacturing process.
Figure 7B:
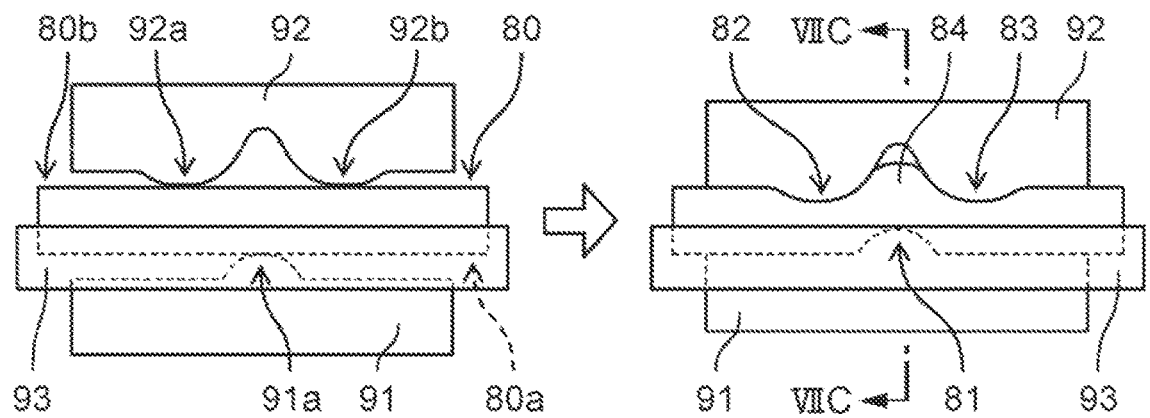
FIG. 7B is an explanatory view of a recess forming step.
Figure 7C:
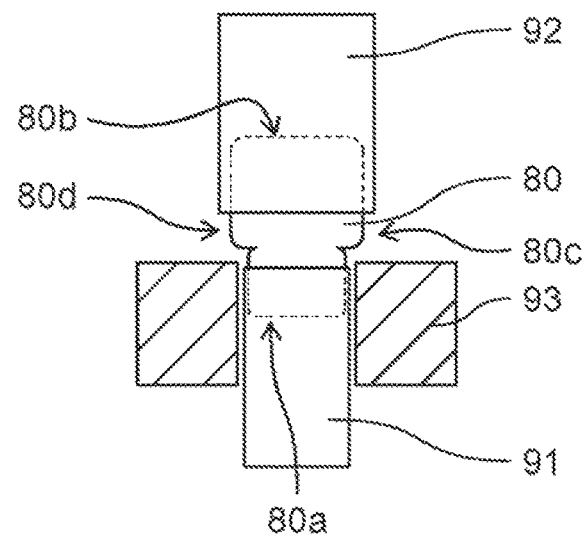
FIG. 7C is a schematic cross-sectional view taken along line VIIC-VIIC in FIG. 7B.
Figure 7D:
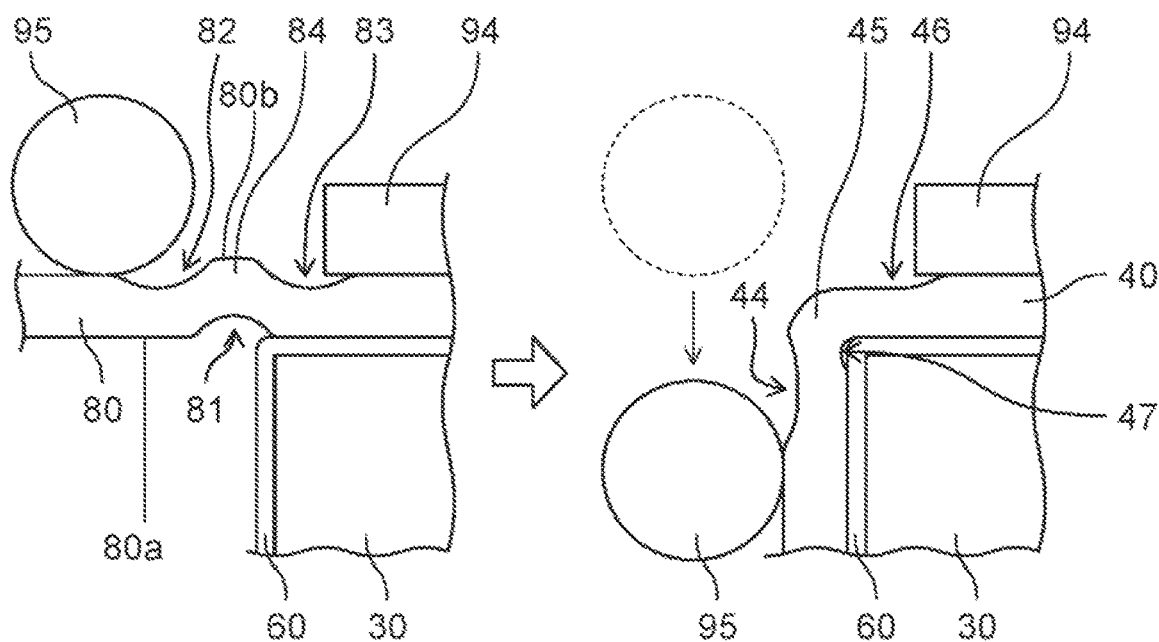
FIG. 7D is an explanatory view of a winding step.
Figure 7E:
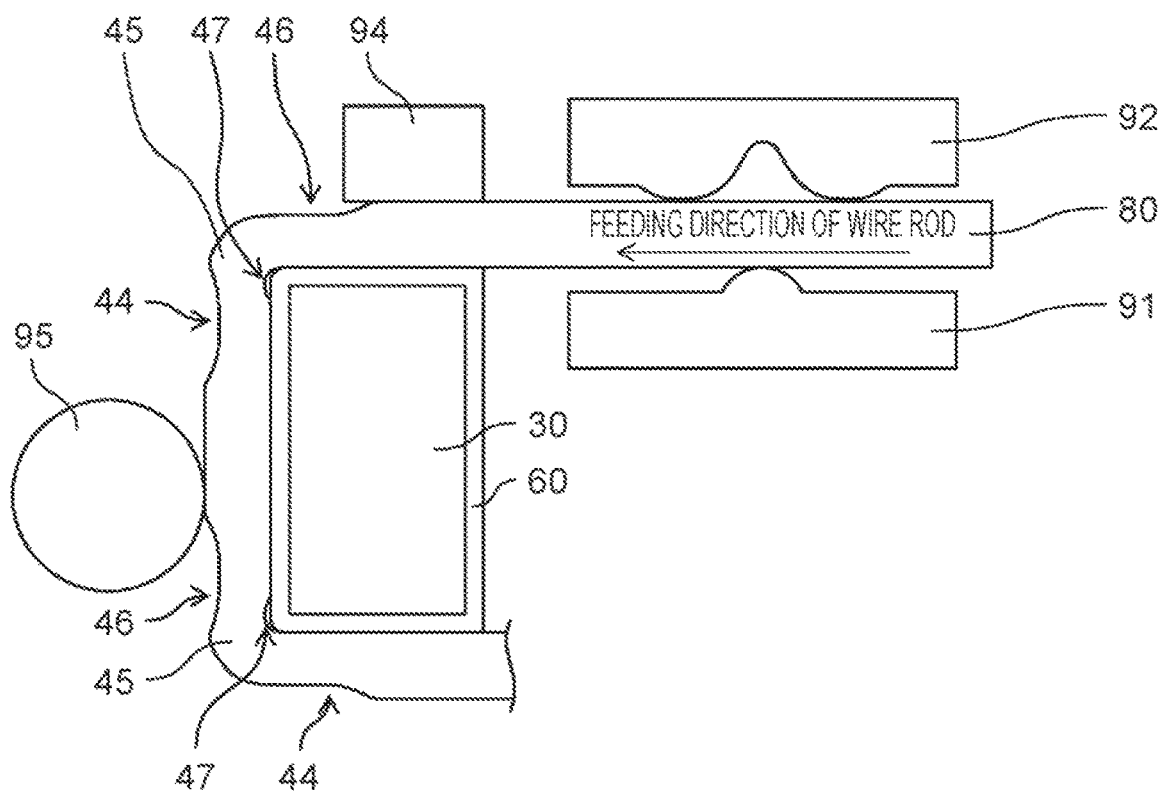
FIG. 7E is a process explanatory view in a case where the recess forming step and the winding step are successively performed.

FIG. 7A is an explanatory view of a wire rod preparing step in a coil manufacturing process. FIG. 7B is an explanatory view of a recess forming step. FIG. 7C is a schematic cross-sectional view taken along line VIIC-VIIC in FIG. 7B. FIG. 7D is an explanatory view of a winding step. FIG. 7E is a process explanatory view in a case where a recess forming step and the winding step are successively performed.

First, as illustrated in FIG. 7A, coil wire rod 80 is prepared (wire rod preparing step). Coil wire rod 80 is conductive wire 50 before being spirally wound. Coil wire rod 80 has a cross-sectional structure illustrated in FIG. 3, that is, a substantially rectangular cross-section. First surface 80*a*, second surface 80*b*, third surface 80*c*, and fourth surface 80*d* illustrated in FIGS. 7A to 7E respectively correspond to first surface 50*a*, second surface 50*b*, third surface 50*c*, and fourth surface 50*d* illustrated in FIG. 3.

Next, as illustrated in FIG. 7B, coil wire rod 80 is set on recess formation first jig 91 such that first surface 80*a*, which is one side surface of coil wire rod 80, faces recess formation first jig 91. Coil wire rod 80 is set such that second surface 80*b* of coil wire rod 80, which faces first surface 80*a*, faces recess formation second jig 92. Widths of first surface 80*a* and second surface 80*b* are substantially equal to the thickness Tb of conductive wire 50 illustrated in FIG. 3. The widths of third surface 80*c* and fourth surface 80*d* are substantially equal to the width Wb of conductive wire 50 illustrated in FIG. 3. Recess formation first jig 91 and recess formation second jig 92 are positioned relatively to each other so as to sandwich coil wire rod 80.

Holding plates 93 are brought into contact with third surface 80*c* and fourth surface 80*d* of coil wire rod 80 so as to fixedly sandwich coil wire rod 80. In this state, recess formation first jig 91 and recess formation second jig 92 respectively come into contact with and press against first surface 80*a* and second surface 80*b* of coil wire rod 80. As illustrated in FIG. 7B, recess formation first jig 91 is provided with first protrusion 91*a*. Recess formation second jig 92 is provided with second protrusion 92*a* and third protrusion 92*b*. By sandwiching and pressing coil wire rod 80 with recess formation first jig 91 and recess formation second jig 92, there is formed, in first surface 80*a* of coil wire rod 80, first recess 81 that corresponds to a shape of first protrusion 91*a* and is directed toward second surface 80*b*. On second surface 80*b*, there are formed two protrusions: second recess 82 that corresponds to a shape of second protrusion 92*a* and is directed toward first surface 80*a*; and third recess 83 that corresponds to a shape of third protrusion 92*b* and is directed toward first surface 80*a* (recess forming step).

As viewed from a direction orthogonal to fourth surface 80*d*, second recess 82 and third recess 83 are formed on both sides of first recess 81. In addition, since first recess 81, second recess 82, and third recess 83 are simultaneously formed, a part of coil wire rod 80 positioned between second recess 82 and third recess 83 is lifted on a first surface 80*a* side, whereby first protrusion 84 is formed. As illustrated in FIG. 7C, since first surface 80*a* side of coil wire rod 80 is sandwiched by holding plates 93, coil wire rod 80 is deformed, so that coil wire rod 80 becomes thicker on a second surface 80*b* side. In other words, a part of coil wire rod 80, sandwiched by holding plates 93, in other words, a part where first recess 81, second recess 82, and third recess 83 are formed is made thicker on the second surface 80*b* side.

After first recess 81, second recess 82, and third recess 83 are formed, holding plates 93, recess formation first jig 91, and recess formation second jig 92 are separated from coil wire rod 80. Then, coil wire rod 80 is fed in a longitudinal direction of coil wire rod 80 by a predetermined distance, and the recess forming step is executed again. By repeating such a process, a plurality of sets of first recesses 81, second recesses 82, third recesses 83, and first protrusions 84 are formed along the longitudinal direction of coil wire rod 80 at predetermined intervals.

As illustrated in FIG. 7D, first surface 80*a* of coil wire rod 80 is brought into contact with a surface of insulator 60 attached to salient pole 30, and guide 94 is brought into contact with the vicinity of third recess 83 on second surface 80*b*, whereby coil wire rod 80 is sandwiched and fixed. At this time, salient pole 30 and guide 94 are prevented from being caught on first recess 81, second recess 82, third recess 83, and first protrusion 84. In this state, bending jig 95 is brought into contact with the vicinity of second recess 82 on second surface 80*b* to press coil wire rod 80, and coil wire rod 80 is wound around the surface of insulator 60 (winding step). At this time, the corner portion of insulator 60 is contained in first recess 81. When coil wire rod 80 is wound around the surface of insulator 60, coil wire rod 80 is stretched at the corner portion of insulator 60, so that corner portion 43 is formed. Specifically, first recess 81 is deformed into recessed portion 47 illustrated in FIGS. 2 to 5, and second recess 82 and third recess 83 are respectively deformed into first bent portion 44 and third bent portion 46 illustrated in FIGS. 2 to 5. In addition, the first protrusion 84 is deformed to become second bent portion 45. In addition, a part not in contact with the corner portion of insulator 60 becomes above-described straight portion 42. In addition, a part of coil wire rod 80 sandwiched by holding plates 93 in the recess forming step, in other words, a part where first recess 81, second recess 82, and third recess 83 are to be formed is extended on the second surface 80*b* side in the winding step. As a result, at the end of the winding step, in the k-th turn of coil 40, the thickness on the first surface 80*a* side and the thickness on the second surface 80*b* side, that is, the thickness $T_{bi}$ on the inner peripheral side and the thickness $T_{bo}$ on the outer peripheral side illustrated in FIG. 6 are substantially equal.

After first bent portion 44, second bent portion 45, third bent portion 46, and recessed portion 47 are formed, guide 94 and bending jig 95 are separated from coil wire rod 80, coil wire rod 80 is fed in the longitudinal direction of coil wire rod 80 by a predetermined distance, and the winding step is executed again. For example, by repeating this step four times, first corner portion 43*a*, second corner portion 43*b*, third corner portion 43*c*, and fourth corner portion 43*d* of the k-th turn of coil 40 are formed. By further repeating a series of the steps, coil 40 having n turns of spirally wound and stacked coil wire rod 80 is finally formed.

As illustrated in FIG. 7E, recess formation first jig 91, recess formation second jig 92, holding plates 93, guide 94, and bending jig 95 may be disposed at predetermined positions along the longitudinal direction of coil wire rod 80, and coil 40 may be formed by repeatedly executing the recess forming step and the winding step while successively feeding coil wire rod 80 in the longitudinal direction.

Although not illustrated, every time one coil 40 is wound around one salient pole 30, coil 40 is cut apart from coil wire rod 80. However, in a case where coil 40 is attached to salient pole 30 later, a plurality of coils 40 may be divided by a unit of one coil or by a unit of a plurality of coils after the plurality of coils 40 are formed on one coil wire rod 80. In this case, coil wire rod 80 is wound around another member having a rectangular cross-section corresponding to the shape of salient pole 30, and coil wire rod 80 having been wound is removed from the another member after the winding step is completed.

In the following description, salient pole 30, salient pole 30 to which insulator 60 is attached, and the above-mentioned another member may be collectively referred to as a "wound member".

[Advantageous Effects and the Like]

As described above, coil 40 according to the present exemplary embodiment is configured such that conductive wire 50 having a substantially rectangular cross-section is wound spirally and is stacked n turns in the radial direction (first direction). The k-th turn of coil 40 has at least straight portion 42 and corner portion 43 extending from the end part of straight portion 42.

On the outer peripheral surface of corner portion 43, at least the following bent portions are formed: first bent portion 44 bent toward the inner peripheral side; second bent portion 45 bent toward the outer peripheral side; third bent portion 46 bent toward the inner peripheral side on the opposite side of first bent portion 44 with second bent portion 45 between first bent portion 44 and third bent portion 46. The curvature C1 of first bent portion 44, the curvature C2 of second bent portion 45, and the curvature C3 of third bent portion 46 are different from each other.

With such a configuration of coil 40, when coil 40 is wound around the wound member having a substantially rectangular cross-section, the stress applied to the outer peripheral side of corner portion 43 is dispersed on first bent portion 44, second bent portion 45, and third bent portion 46. Therefore, damage to conductive wire 50 can be suppressed.

In some cases, salient pole 30 of stator 10 around which coil 40 is wound has a rectangular prism shape whose cross-section is rectangular. When coil 40 is mounted along the outer peripheral surface of salient pole 30, stress concentrates on conductive wire 50 constituting coil 40 at a part being in contact with the corner portion thereof, and there is a possibility that insulating film 52 gets damaged or that a required strength cannot be secured. Also when insulator 60 is attached to salient pole 30, since insulator 60 has a rectangular cylindrical shape corresponding to the shape of salient pole 30, there is a possibility that insulation properties of coil 40 are similarly deteriorated at the corner portion.

According to the present exemplary embodiment, it is possible to suppress a decrease in strength of insulating film 52 due to concentration of local stress on insulating film 52. This makes it possible to ensure the insulation properties of coil 40.

In addition, the curvatures C1, C2, and C3 of first bent portion 44, second bent portion 45, and third bent portion 46 are different from each other. Therefore, a degree of stress applied to first bent portion 44, second bent portion 45, and third bent portion 46 are different from each other. As a result, the stress can be more effectively dispersed. In addition, coil 40 is configured by winding conductive wire 50 of a so-called flat square wire having a substantially rectangular cross-section. Therefore, when coil 40 is attached to salient pole 30 of stator 10, the space factor in the slot is increased.

At least two of first bent portion 44, second bent portion 45, and third bent portion 46 may be made to have different curvatures. Also with this arrangement, the stress is dispersed on first bent portion 44, second bent portion 45, and third bent portion 46, and the damage of conductive wire 50 can be suppressed, so that the decrease in the strength of insulating film 52 and consequently the decrease in the insulation properties of coil 40 can be suppressed.

Recessed portion 47 directed toward the outer peripheral side is formed on the inner peripheral surface of second bent portion 45 of coil 40.

With such a configuration of coil 40, when coil 40 is wound around the wound member, the corner portion of the wound member is contained in recessed portion 47. As a result, for example, it is possible to suppress such a damage to conductive wire 50 that is caused when conductive wire 50 of coil 40 comes into contact with the corner portion of salient pole 30. In addition, it is possible to suppress the decrease in the strength of insulating film 52 and consequently the decrease in the insulation properties of coil 40 due to local concentration of stress on insulating film 52. Furthermore, it is possible to wind a winding wire along an outer peripheral surface of salient pole 30 or insulator 60 attached to salient pole 30 that have corner portions. As a result, coil 40 can be downsized.

The line width We between second bent portion 45 and recessed portion 47 is preferably 90% or more of the line width Wb of straight portion 42.

With such a configuration of coil 40, it is possible to suppress a local increase in resistance of coil 40. Therefore, it is possible to reduce heat generation when a current flows through coil 40. As a result, for example, it is possible to suppress loss caused by the current flowing through coil 40 when motor 100 is driven, whereby the efficiency of motor 100 is improved.

In addition, at corner portion 43 of coil 40, the thickness of the k-th turn in the radial direction is substantially same between the outer peripheral side and the inner peripheral side. That is, as illustrated in FIG. 6, the thickness $T_{bi}$ on the inner peripheral side and the thickness $T_{bo}$ on the outer peripheral side are substantially equal.

With such a configuration of coil 40, in a case where coil 40 is mounted on salient pole 30 of stator 10, the space factor in the slot and consequently the efficiency of motor 100 is increased.

In addition, conductive wire 50 preferably includes spirally wound metal wire 51 and insulating film 52 covering metal wire 51.

A manufacturing method for a coil according to the present exemplary embodiment includes at least the following steps: a wire rod preparing step for preparing coil wire rod 80 (conductive wire 50) having a first surface 80a and second surface 80b opposed to first surface 80a; a recess forming step including: forming, in first surface 80a of coil wire rod 80, first recesses 81 directed toward second surface 80b at predetermined intervals along a longitudinal direction of coil wire rod 80; and forming, on the second surface 80b, second recess 82 and third recess 83 that are directed toward first surface 80a on respective ones of both sides of a position opposed to each of first recesses 81; and a winding step of winding coil wire rod 80 around a wound member having a rectangular cross-section, wherein first surface 80a of coil wire rod 80 is in contact with a surface of the wound member, and corner portions of wound member are each contained in one of first recesses 81.

By this manufacturing method, it is possible to easily form, in coil 40, first bent portion 44, second bent portion 45, third bent portion 46, and recessed portion 47.

Stator 10 according to the present exemplary embodiment is stator 10 for motor 100, and includes at least annular yoke 20, the plurality of salient poles 30 connected to the inner periphery of yoke 20, and coils 40 attached to respective ones of the plurality of salient poles 30.

With such a configuration of stator 10, it is possible to suppress a decrease in insulation between salient poles 30 and coils 40. In addition, the space factor in the slot and consequently the efficiency of motor 100 is increased.

Recessed portion 47 is formed, toward the outer peripheral surface, in the inner peripheral surface of second bent portion 45 formed on each of first corner portion 43a, second corner portion 43b, third corner portion 43c, and fourth corner portion 43d. The four corner portions of salient pole 30 are contained in respective ones of recessed portions 47 formed in first corner portion 43a, second corner portion 43b, third corner portion 43c, and fourth corner portion 43d.

With such a configuration of stator 10, it is possible to suppress damage to conductive wire 50 of coil 40. Furthermore, it is possible to suppress a decrease in insulation between salient pole 30 and coil 40 caused by local concentration of stress on insulating film 52 of coil 40 at the corner portions of salient pole 30. Furthermore, it is possible to wind a winding wire along the outer peripheral surface of salient pole 30 or insulator 60 attached to salient pole 30. Therefore, coil 40 and consequently motor 100 can be downsized.

Motor 100 according to the present exemplary embodiment includes at least stator 10 and rotor 70 that is disposed radially inside stator 10 with a predetermined interval therebetween.

With the present exemplary embodiment, it is possible to suppress damage to conductive wire 50 of coil 40. In addition, it is possible to suppress a decrease in insulation between salient poles 30 and coils 40. As a result, the reliability of motor 100 can be secured. In addition, the space factor in the slot and consequently the efficiency of motor 100 is increased.

First Modification

Figure 8A:
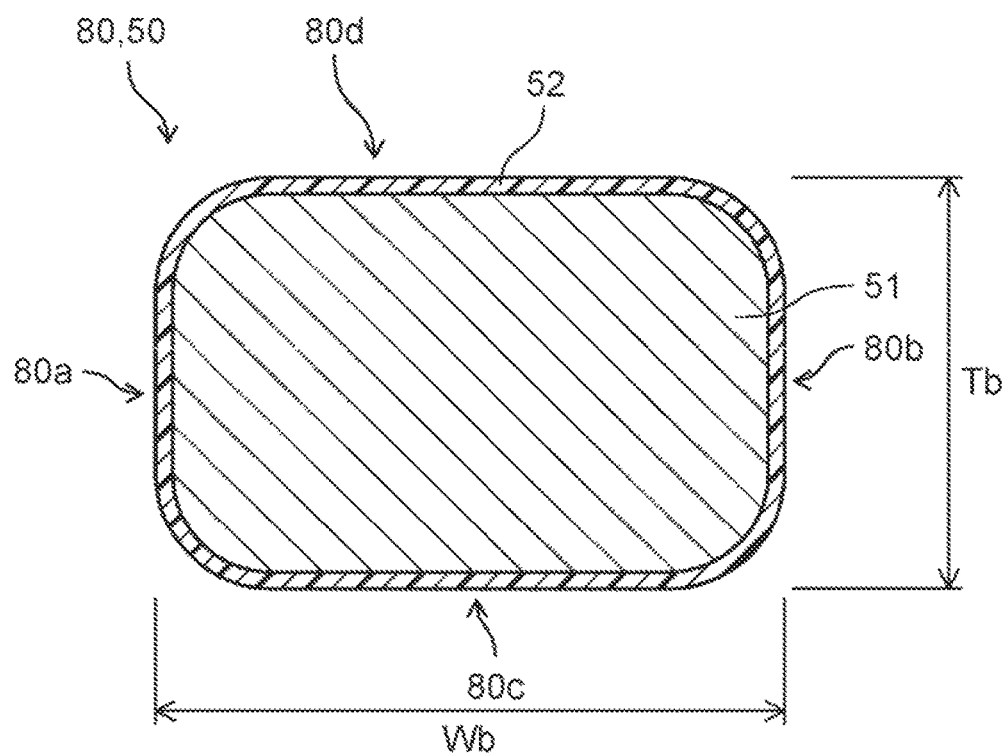
FIG. 8A is a schematic cross-sectional view of a coil wire rod according to a first modification.
Figure 8B:
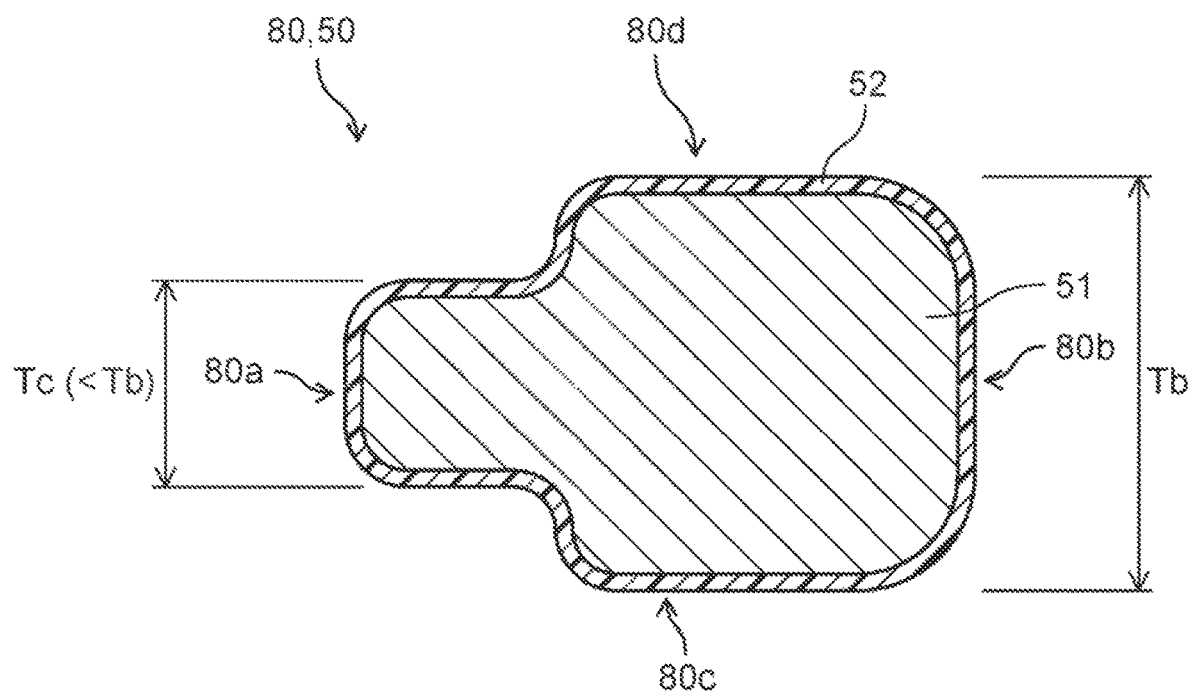
FIG. 8B is a schematic cross-sectional view of a coil wire rod according to the first modification.

FIGS. 8A and 8B are schematic cross-sectional views of a coil wire rod according to a first modification. FIG. 8A illustrates a cross-section of a part corresponding to the straight portion of the coil. FIG. 8B illustrates a cross-section of a part corresponding to the corner portion. In FIG. 8, the same parts as those in the first exemplary embodiment are denoted by the same reference marks, and the detailed description thereof will be omitted. FIGS. 8A and 8B show cross-sections at the end of the wire rod preparing step shown in the first exemplary embodiment. Therefore, it can also be said that FIG. 8B illustrates a cross-section of a part where the first to third recesses are to be formed.

As illustrated in FIG. 8A, the cross-section of the part corresponding to straight portion 42 of coil 40 is the same as the cross-section illustrated in FIG. 3. On the other hand, as illustrated in FIG. 8B, in the part where first recess 81, second recess 82, and third recess 83 are to be formed, the thickness Tc on first surface 80a side is thinner than the thickness Tb on second surface 80b side.

In the first exemplary embodiment, by sandwiching coil wire rod 80 with holding plates 93, a part where first recess 81, second recess 82, and third recess 83 are to be formed is thickened on the second surface 80b side. With this configuration, when coil wire rod 80 is wound, the thickness at corner portion 43 of coil 40 becomes substantially equal between the inner peripheral side and the outer peripheral side.

However, depending on the thickness or hardness of coil wire rod 80, even when coil wire rod 80 is sandwiched by holding plates 93, coil wire rod 80 is not sufficiently deformed in some cases, so that coil wire rod 80 will not be thickened on the second surface 80b side. In such a case, at the end of the winding step, the inner peripheral side is thinner than the outer peripheral side at corner portion 43 of coil 40 in some cases, so that it will be difficult to sufficiently increase the space factor of coil 40.

In contrast, according to the present modification, by previously making thinner the first surface 80a side, which corresponds to the inner peripheral surface of the coil 40, of a part of coil wire rod 80, in other words, a part where first recess 81, second recess 82, and third recess 83 are to be formed, the second surface 80b side of such part is stretched in the winding step. Finally, at corner portion 43 of coil 40, the thickness on first surface 80a side and the thickness on second surface 80b side, that is, the thickness $T_{bi}$ on the inner peripheral side and the thickness $T_{bo}$ on the outer peripheral side can be made substantially equal to each other. As a result, when coil 40 is attached to salient pole 30 of stator 10, the space factor in the slot is increased, and consequently, the efficiency of motor 100 is increased.

Note that coil wire rod 80 illustrated in FIGS. 8A and 8B can be easily obtained by shaping metal wire 51 using a predetermined jig in a step of stretching and shaping metal wire 51. Besides this method, the first surface 80a side of the part of the conductive wire 50 where first recess 81, second recess 82, and third recess 83 are to be formed can be thinned by pressing or cutting.

Second Modification

FIG. 9 is an explanatory view of a coil manufacturing process according to a second modification. In FIG. 9, the same parts as those in the first exemplary embodiment are denoted by the same reference marks, and the detailed description thereof will be omitted.

When first recess 81 corresponding to recessed portion 47 is formed in coil wire rod 80, if first recess 81 is formed symmetrically with respect to an axis in the width direction of coil wire rod 80, in other words, with respect to axis AA substantially orthogonal to the longitudinal direction of coil wire rod 80 and passing through a bottom portion of first recess 81, coil wire rod 80 is stretched in the vicinity of first recess 81 in the winding step. As a result, the finally formed recessed portion 47 can have an asymmetric shape. In such a case, it is necessary to give an allowance to a gap between first recess 81 and the wound member including salient pole 30 so that the corner portion of salient pole 30 and recessed portion 47 are not strongly in contact with each other.

However, for example, this measure can make the line width Wc between second bent portion 45 and recessed portion 47 narrower at corner portion 43, so that the resistance of coil 40 can increase.

In contrast, in the present modification, in the recess forming step, first recess 81 is formed so as to be asymmetric with respect to axis AA in the width direction of coil wire rod 80, so that the gap between first recess 81 and the corner portion of the wound member is reduced at the end of the winding step.

The present modification can make smaller a size of recessed portion 47 of coil 40 corresponding to first recess 81. Therefore, it is possible to suppress a local increase in resistance of coil 40 caused by a decrease in the above-described line width Wc at corner portion 43 of coil 40. As a result, it is possible to suppress the loss caused by the current flowing through coil 40 when motor 100 is driven, and it is thereby possible to increase the efficiency of motor 100. In addition, the size of recessed portion 47 can be reduced. As a result, coil 40 can be downsized.

Third Modification

Figure 10:
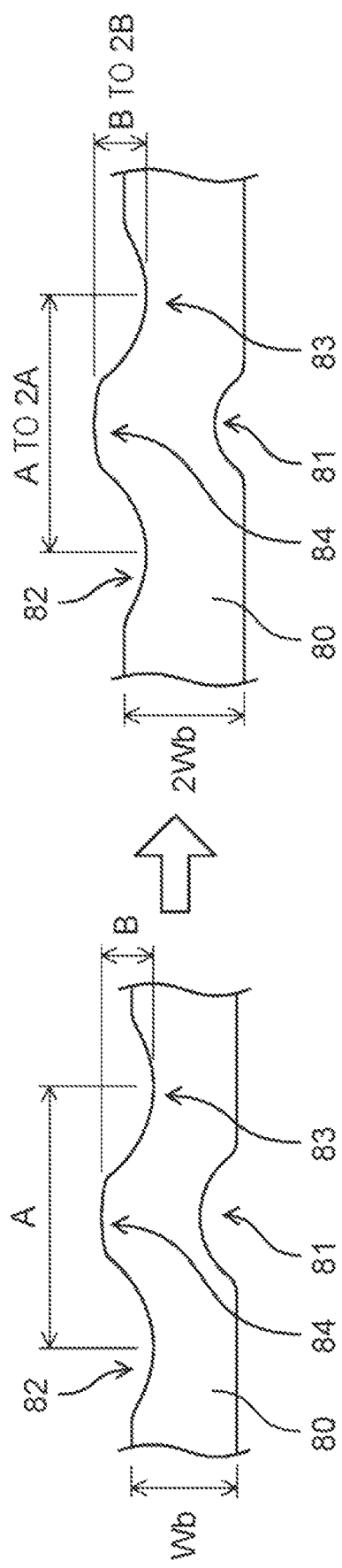
FIG. 10 is a plan view of a coil wire rod according to a third modification.

FIG. 10 is a plan view of a coil wire rod according to a third modification. Specifically, FIG. 10 illustrates the coil wire rod at the end of the recess forming step. In FIG. 10, the same parts as those in the first exemplary embodiment are denoted by the same reference marks, and the detailed description thereof will be omitted.

As described in the first exemplary embodiment, in the recess forming step, first recess 81, second recess 82, third recess 83, and first protrusion 84 are formed. A distance A between a bottom of second recess 82 and a bottom of third recess 83 and a distance B between the bottom of third recess 83 and a top of first protrusion 84 along a line width direction of coil wire rod 80 correspond to the size of corner portion 43 of coil 40 formed when coil wire rod 80 (conductive wire 50) is wound.

Meanwhile, in the case where the line width of coil wire rod 80 is wider, it is necessary to change both the distances A and B so that an effect of dispersing the stress by first bent portion 44, second bent portion 45, and third bent portion 46 of the finally formed coil 40 is not lowered. Specifically, as illustrated in FIG. 10, when the line width of the coil wire rod is doubled, first recess 81, second recess 82, third recess 83, and first protrusion 84 are formed such that both the distances A and B are also approximately doubled. However, the distances A and B may not be changed in direct proportion to the line width of coil wire rod 80. First recess 81, second recess 82, third recess 83, and the first protrusion 84 may be formed such that as the line width of coil wire rod 80 becomes wider, both the distance A and the distance B become accordingly longer.

Second Exemplary Embodiment

FIG. 11A is a schematic cross-sectional view of a motor according to a second exemplary embodiment. FIG. 11B is a schematic cross-sectional view taken along line XIB-XIB in FIG. 11A. As illustrated in FIGS. 11A and 11B, motor 300 includes frame 110, end plate 120, bearings 210, 220, rotor 130, stator 190, and brushes 180. Similarly to the first exemplary embodiment, a radial direction of motor 300 is referred to as a "radial direction", an outer circumferential direction is referred to as a "circumferential direction", and a direction in which shaft 140 extends is referred to as an "axial direction". In the radial direction, the center side of motor 300 is referred to as radially inside, and the outer peripheral side is referred to as radially outside.

Frame 110 is a bottomed semi-cylindrical metal member having an opening in an upper part. End plate 120 is a plate-shaped member made of a molded resin material. End plate 120 includes: a substantially disk-shaped base portion 121; through hole 122 provided at a center of base portion 121; brush holder 123 formed on an inner surface of base portion 121; and bearing holder 124 formed on an outer surface of base portion 121.

End plate 120 is disposed on frame 110 to cover the opening. Rotor 130 is contained in a space defined by frame 110 and end plate 120. Shaft 140 is disposed through through hole 122 of end plate 120 and protrudes from end plate 120 to the outside of frame 110, and shaft 140 is rotatably supported by bearings 210, 220.

Rotor 130 includes shaft 140, armature 150, commutator 160, and insulator 170. Armature 150 includes armature core 151, a plurality of salient poles 152, and armature windings (coils) 153. Shaft 140 is press-fitted in a through hole (not shown) provided at an axial center of armature core 151, whereby armature 150 is fixedly attached to an outer peripheral surface of shaft 140.

On armature core 151, the plurality of salient poles 152 protruding radially outward are disposed at predetermined intervals in the circumferential direction. Armature windings 153 are attached to respective ones of the plurality of salient poles 152 via an insulator 170 made of an insulating resin. Armature windings 153 drawn from armature core 151 are connected (not shown) to commutator 160. Armature core 151 and salient poles 152 are formed by punching a plurality of stacked electromagnetic steel sheets. Armature core 151 and salient poles 152 constitute magnetic paths through which magnetic flux generated in armature windings 153 passes. Shaft 140 is provided at an axial center of rotor 130. Passing through the centers of armature core 151 and commutator 160, shaft 140 is connected thereto.

Not illustrated, but a cross-section of the salient pole 152 in the axial direction is substantially rectangular. Insulator 170 attached to the salient pole 152 also has a rectangular cylindrical shape corresponding to an outer shape of salient pole 152.

Armature winding 153 attached to each of salient poles 152 has the same shape as coil 40 illustrated in FIGS. 2 to 6. That is, armature winding 153 is coil 40 configured such that conductive wire 50 having a substantially rectangular cross-section is wound spirally and is stacked n turns in the radial direction (first direction). The k-th turn of coil 40 has at least straight portion 42 and corner portion 43 extending from the end part of straight portion 42.

On the outer peripheral surface of corner portion 43, the following bent portions are formed: first bent portion 44 bent toward the inner peripheral side; second bent portion 45 bent toward the outer peripheral side; third bent portion 46 bent toward the inner peripheral side and located on the opposite side of first bent portion 44 with second bent portion 45 between first bent portion 44 and third bent portion 46. At least two of first bent portion 44, second bent portion 45, and third bent portion 46 have different curvatures from each other.

Furthermore, recessed portion 47 directed toward the outer peripheral surface is formed in the inner peripheral surface of second bent portion 45 formed on each of first corner portion 43a, second corner portion 43b, third corner portion 43c, and fourth corner portion 43d. The four corner portions of salient pole 152 are contained in respective ones of recessed portions 47 formed in first corner portion 43a, second corner portion 43b, third corner portion 43c, and fourth corner portion 43d.

Commutator 160 is fixedly attached to the outer peripheral surface of shaft 140 along the axial direction at a predetermined interval from armature 150.

Stator 190 includes frame 110 and a plurality of permanent magnets 191 disposed on an inner peripheral surface of frame 110 in the circumferential direction at predetermined intervals. Permanent magnets 191 adjacent to each other in the circumferential direction are disposed to have different polarities. Frame 110 also functions as a yoke constituting a magnetic circuit with permanent magnets 191.

Brushes 180 are made of a carbon brush material such as graphite containing a solid lubricant. Brushes 180 are held in brush holder 123 provided on an inner surface of end plate 120. Brushes 180 are pressed against commutator 160 by brush springs (not shown).

An operation of motor 300 configured as described above will be described.

Electric power is supplied to motor 300 from outside through electric wires (not shown) drawn out from an electric wire drawing port (not shown) provided in end plate 120. As a result, an armature current flows through armature windings 153 via brushes 180 and commutator 160. An interaction occurs between a magnetic field generated by permanent magnets 191 of stator 190 and a magnetic field generated by the armature current flowing through armature windings 153, whereby a rotational torque is generated in rotor 130. Shaft 140 is supported by bearings 210, 220, and rotor 130 rotates about an axial line that passes through an axial center of shaft 140 and extends in the axial direction. Corresponding to rotation of shaft 140, brushes 180 and commutator 160 cyclically repeat contact and separation, and directions of the armature currents flowing through armature windings 153 are changed in accordance with this cycle. As a result, shaft 140 can continuously rotate in the clockwise direction or the counterclockwise direction.

As described above, rotor 130 according to the present exemplary embodiment is rotor 130 of motor 300, and includes: at least shaft 140 rotatably provided about a predetermined axial line; the plurality of salient poles 152 provided on an outer peripheral side of shaft 140 and extending in the radial direction of motor 300; and armature windings (coils) 153 attached to respective ones of the plurality of salient poles 152.

With such a configuration of rotor 130, it is possible to suppress damage to conductive wire 50 (see FIG. 3) constituting armature windings (coils) 153. Furthermore, it is possible to suppress a decrease in insulation between salient poles 152 of rotor 130 and armature windings (coils) 153. In addition, the space factor of armature windings (coils) 153 in rotor 130 and consequently the efficiency of motor 300 can be increased.

In addition, four corner portions of salient pole 152 are contained in respective ones of recessed portions 47 formed in the first corner portion 43a, second corner portion 43b, third corner portion 43c, and fourth corner portion 43d of the armature winding (coil) 153. As a result, it is possible to suppress a decrease in insulation between salient pole 152 and armature windings (coils) 153 due to local concentration of stress on insulating film 52 of armature windings (coils) 153 at the corner portions of salient pole 152. Furthermore, it is possible to wind conductive wire 50 along the outer peripheral surface of salient pole 152 or insulator 170 attached to salient pole 152. Therefore, coil 153 and consequently rotor 130 can be downsized.

Motor 300 according to the present exemplary embodiment includes at least: rotor 130; and stator 190 disposed radially outside rotor 130 with a predetermined interval from rotor 130.

According to the present exemplary embodiment, it is possible to suppress a decrease in insulation between salient poles 152 and coils 153 and thereby to secure the reliability of motor 300. In addition, the space factor of coils 153 in rotor 130 and consequently the efficiency of motor 300 can be increased.

Other Exemplary Embodiments

It is possible to combine the components disclosed in the several exemplary embodiments described above to make up a new exemplary embodiment. For example, first recess 81 described in the second modification may be formed on coil wire rod 80 (conductive wire 50), and then, coil wire rod 80 (conductive wire 50) may be spirally wound to form armature winding (coil) 153 described in the second exemplary embodiment.

Note that coil 40 may have a configuration other than the configuration in which metal wire 51 having insulating film 52 formed on the surface thereof is wound as described in the first exemplary embodiment. For example, coil 40 may be constituted by conductive wire 50 on which insulating film 52 is formed after metal wire 51 is wound. Alternatively, coil 40 may be constituted by a conductive wire on which insulating film 52 is formed while metal wire 51 is being wound. In addition, as long as a short circuit between metal wires 51 included in coil 40 is suppressed, insulating film 52 may be omitted, and metal wire 51 may be used as conductive wire 50. In this case, coil 40 is configured by winding metal wire 51.

Similarly, coil 153 described in the second exemplary embodiment may be configured with conductive wire 50 made in such a manner that insulating film 52 is formed after or while metal wire 51 is wound. Alternatively, insulating film 52 may be omitted, and metal wire 51 may be used as conductive wire 50.

Instead of insulator 60 or insulator 170, insulating paper may be used. In this case, the distance between each corner portion of salient pole 30 or salient pole 152 and coil 40 or coil 153 is shorter. In addition, the stress applied by the corner portion to coil 40 or coil 153 is larger. Therefore, when coil 40 or coil 153 of the present disclosure is applied to stator 190 or rotor 130, it is possible to suppress damage to conductive wire 50 constituting coil 40 or coil 153. In addition, it is possible to reliably suppress a decrease in insulation between salient poles 30 or salient poles 152 and coils 40 or coils 153. Therefore, the reliability of motor 100 or motor 300 can be secured. In addition, when insulating paper is used, a capacity of the slot provided in at least one of stator 190 and rotor 130 can be increased as compared with the case of using the rectangular tube-shaped insulator 60 or insulator 170. Therefore, the space factor of coil 40 or coil 153 and consequently the efficiency of motor 100 or 300 can be increased.

FIG. 12A is a schematic cross-sectional view, in the axial direction, of a salient pole to which another type of coil is attached. FIG. 12B is a schematic cross-sectional view, in the axial direction, of a salient pole to which still another type of coil is attached. In the first exemplary embodiment, first bent portion 44, second bent portion 45, and third bent portion 46 are provided at each corner portion 43 of coil 40. However, as illustrated in FIG. 12A, third bent portion 46 may be omitted. Alternatively, as illustrated in FIG. 12B, first bent portion 44 may be omitted. Specifically, on each corner portion 43 of coil 40, in other words, on the outer peripheral surface of each of first corner portion 43a, second corner portion 43b, third corner portion 43c, and fourth corner portion 43d, there are formed at least: first bent portion 44 or third bent portion 46 bent toward the inner peripheral side; and second bent portion 45 bent toward the outer peripheral side. The curvature C1 of first bent portion 44 needs to be different from the curvature C2 of second bent portion 45, or the curvature C3 of third bent portion 46 needs to be different from the curvature C2 of second bent portion 45.

Also, with the above arrangement, the stress can be dispersed at each bent portion on the outer peripheral side of corner portion 43, so that the same effect as that of the first exemplary embodiment can be obtained.

In addition, it goes without saying that when coil 153 described in the second exemplary embodiment is configured in the same manner as the configuration illustrated FIG. 12A or 12B, the same effect is provided.

Furthermore, each of first bent portion 44, second bent portion 45, and third bent portion 46 does not need to have a uniform curvature. For example, a plurality of portions having different curvatures may be formed in first bent portion 44.

Furthermore, the motor to which coil 40 or coil 153 of the present disclosure can be applied is not limited to motor 100 or motor 300 described in the first exemplary embodiment or the second exemplary embodiment. For example, the coil of the present disclosure may be applied to an outer-rotor type brushless motor. In that case, a plurality of salient poles are provided on a stator disposed at the axial center of the motor, and the coils of the present disclosure are attached to respective ones of the plurality of salient poles.

Also in this case, it is possible to suppress a decrease in insulation between the salient poles of the stator and the coils. Therefore, the reliability of the motor can be secured. In addition, the space factor of the coils in the stator is increased. Therefore, the efficiency of the motor can be improved.

The coil of the present disclosure increases its space factor in the stator or the rotor, and at the same time, secures its insulation. Therefore, the coil is useful, for example, for application to a motor used in an in-vehicle application or an industrial application.

The invention claimed is:

1. A coil comprising:
n turns of spirally wound conductive wire having a rectangular cross-section, where n is an integer of 2 or more, the n turns of spirally wound conductive wire being stacked in a first direction,
wherein a k-th turn, where k is an integer and 1≤k≤n, of the coil includes four straight portions and four corner portions each connecting adjacent two straight portions,
one of the straight portions connects the k-th turn to a (k−1)-th turn or a (k+1) turn,
an outer peripheral surface of at least one of the corner portions has at least a first bent portion formed to be bent toward an inner peripheral side and a second bent portion formed to be bent toward an outer peripheral side, and
a curvature of the first bent portion is different from a curvature of the second bent portion.

2. The coil according to claim 1, wherein a recessed portion directed toward the outer peripheral side is formed in an inner peripheral surface of the second bent portion.

3. The coil according to claim 2, wherein a line width between the second bent portion and the recessed portion is 90% or more of a line width of the straight portions.

4. The coil according to claim 1, wherein:
a third bent portion bent toward the inner peripheral side is further formed in the outer peripheral surface of the at least one of the corner portions on an opposite side of the first bent portion with the second bent portion interposed between the first bent portion and the third bent portion, and
at least two of the first bent portion, the second bent portion, and the third bent portion have different curvatures from each other.

5. The coil according to claim 4, wherein each of the four corner portions has the first bent portion, the second bent portion and the third bent portion.

6. The coil according to claim 5, wherein each of the straight portions connects the first bent portion of one of the four corner portions and the third bent portion of another of the four corners.

7. The coil according to claim 1, wherein a thickness of the corner portion in the first direction is same between the outer peripheral side and the inner peripheral side.

8. The coil according to claim 1, wherein the conductive wire includes a spirally wound metal wire and an insulating film covering the metal wire.

9. A stator for a motor, comprising at least:
an annular yoke;
a plurality of salient poles connected to an inner periphery of the annular yoke; and
a plurality of coils each corresponding to the coil according to claim 1 attached to respective ones of the plurality of salient poles.

10. A motor comprising at least:
the stator according to claim 9; and
a rotor disposed radially inside the stator with a predetermined gap between the rotor and the stator.

11. A rotor for a motor, comprising at least:
a shaft rotatably provided around a predetermined axial line;
a plurality of salient poles provided on an outer peripheral side of the shaft and extending in a radial direction of the motor; and
a plurality of coils each corresponding to the coil according to claim 1 attached to respective ones of the plurality of salient poles.

12. A motor comprising at least:
the rotor according to claim 11; and
a stator disposed radially outside the rotor with a predetermined gap between the stator and the rotor.

13. A manufacturing method for a coil comprising at least:
a wire rod preparing step for preparing a conductive wire having a first surface and a second surface opposed to the first surface;
a recess forming step including:
forming, in the first surface of the conductive wire, first recesses directed toward the second surface at predetermined intervals along a longitudinal direction of the conductive wire; and
forming, on the second surface, a second recess and a third recess that are directed toward the first surface on respective ones of both sides of a position opposed to each of the first recesses; and
a winding step of winding the conductive wire around a wound member having a rectangular cross-section by bending the conductive wire having the first, second and third recesses at the first recess, wherein:
the first surface of the conductive wire is in contact with a surface of the wound member,
corner portions of the wound member each are contained in one of the first recesses.

14. The manufacturing method for a coil according to claim 13, wherein in a part of the conductive wire prepared in the wire rod preparing step where the first recess, the second recess, and the third recess are to be formed, a thickness is thinner on a side of the first surface than on a side of the second surface.

15. The manufacturing method for a coil according to claim 13, wherein in the recess forming step, the first recess is formed asymmetric with respect to an axis that is orthogonal to the longitudinal direction of the conductive wire and passes through a bottom part of the first recess, and
a gap between the first recess and a corner portion of the wound member is reduced at an end of the winding step.

16. The manufacturing method for a coil according to claim 13, wherein in the recess forming step, a first protrusion is formed at a part, of the second surface of the conductive wire, facing the first recess, and
the first recess, the second recess, and the third recess are formed such that when a width W of the conductive line is wider, a distance A between a bottom of the second recess and a bottom of the third recess and a distance B between the bottom of the third recess and a top of the first protrusion along a line width direction of the conductive wire are each accordingly longer.

* * * * *